United States Patent Office 3,437,689
Patented Apr. 8, 1969

3,437,689
AROMATIC AMINO ACID
Richard E. Brown, Hanover, and Robert I. Meltzer, Rockaway, N.J., assignors to Warner-Lambert Pharmaceutical Company, Morris Plains, N.J., a corporation of Delaware
No Drawing. Original application July 18, 1963, Ser. No. 296,088, now Patent No. 3,265,700, dated Aug. 9, 1966. Divided and this application Jan. 13, 1966, Ser. No. 520,367
Int. Cl. C07c *101/78, 101/40, 101/72*
U.S. Cl. 260—518                                              1 Claim

ABSTRACT OF THE DISCLOSURE

The present invention discloses compounds of the formula:

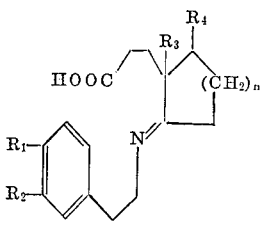

wherein $R_1$ and $R_2$ each may represent hydrogen or lower alkoxy, $R_3$ represents hydrogen or lower alkyl, $R_4$ represents hydrogen, hydroxy or keto, and $n$ is 1 or 2.

The corresponding lactams are useful for the production of 8-azasteroids as described in U.S. Patent No. 3,341,543, issued Sept. 12, 1967.

---

This is a divisional application of application Ser. No. 296,088 filed July 18, 1963 now U.S. Patent No. 3,265,700, issued Aug. 9, 1966.

This invention relates to a novel process for the production of lactams having the following structural formula:

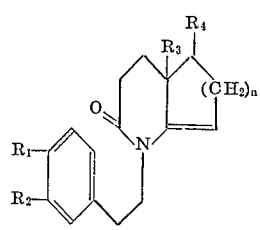

wherein $R_1$ and $R_2$ each represents hydrogen or lower alkoxy such as methoxy, ethoxy, or propoxy, $R_3$ represents hydrogen or lower alkyl such as methyl, ethyl, propyl or butyl and $R_4$ represents hydrogen, hydroxy, or keto, and $n$ is an integer of 1 or 2.

These substituted lactams are important intermediates for the production of 8-azasteroids, the preparation of which is described and claimed in our co-pending application Ser. No. 248,872 filed Jan. 2, 1963, now Patent No. 3,341,543. In addition, these lactams can also be used as starting materials for other substituted quinolizines.

In accordance with this invention, these lactams are produced by the following reaction steps. The symbols $R_1$, $R_2$, $R_3$ and $R_4$ used hereinafter in describing said reactions have the same meaning as defined above.

Step 1 comprises reacting an appropriately substituted β-phenethylamine with cyclic keto acid in a low boiling water-immiscible solvent under the conditions of water removal such as by the use of a Dean-Stark trap. The reaction may be represented by the equation:

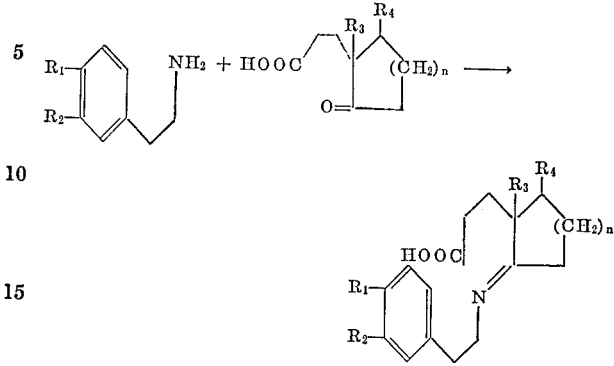

Low boiling water immiscible solvents which may be conveniently employed in this reaction are for example methylene chloride, chloroform, or benzene.

The resulting Schiff's base obtained in accordance with Step 1 is preferably treated directly without isolation with an equal molar ratio of a substituted carbodiimide of the formula R'—N=C=N—R' in which R' may be a monovalent polar radical such as cyclohexyl, isopropyl, isobutyl, and the like. N,N'-dicyclohexylcarbodiimide is commercially available and is therefore the preferred reagent of choice. The treatment of the Schiff's base with the carbodiimide results in the formation of an amide bond between the carboxyl group and the nitrogen atom to give the desired lactams. The reaction is expressed by the following equations:

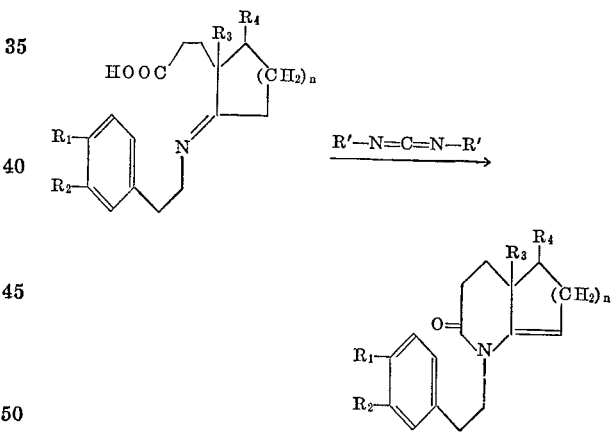

The lactams obtained may then be cyclized to give 8-azasteroids as described in said co-pending application. Thus for example the lactam may be treated with phosphorous oxychloride to give an 8-azasteroid of the formula:

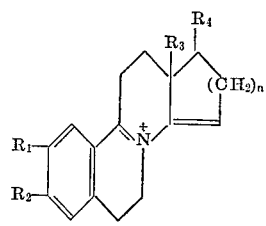

In order to further illustrate this information, the following examples are given:

EXAMPLE 1

4,4a-dihydro-1-(m-methoxyphenethyl)-4a-methyl-1H-1-pyridine-2,5-(3H,6H)-dione

A solution of 45.5 g. of 2-(β-carboxyethyl)-2-methyl-1,3-cyclopentanedione and 37.8 g. of m-methoxyphenethylamine in 2.5 liters of methylene chloride is refluxed for 2½ hours under a modified Dean-Stark trap. A solution of 51.5 g. of dicyclohexylcarbodiimide in 100 ml. methylene chloride is then added slowly. The resulting slurry is refluxed with stirring for 10 minutes, then cooled for 16–24 hours at 10° C. The slurry is filtered and the filtrate poured directly onto 3.75 kg. of alumina. The column is washed with 16 liters of methylene chloride and the solvent removed from this fraction to give 4,4a-dihydro-1-(m-methoxyphenethyl) - 4a - methyl-1H-1-pyridine-2,5-(3H,6H)-dione in the form of a pale yellow oil.

EXAMPLE 2

4,4a-dihydro-1-(3,4-dimethoxyphenethyl)-4a-methyl-1H-1-pyridine-2,5-(3H,6H)-dione In the same way as described in Ex. 1, 18.1 g. of homoveratrylamine and 18.4 g. of 2-($\beta$-carboxyethyl)-2-methyl-1,3-cyclopentanedione on treatment with 20.6 g. of dicyclohexylcarbodiimide gave 4,4a-dihydro - 1 - (3 - dimethoxyphenethyl) - 4a - methyl-1H-1-pyridine-2,5-(3H,6H)-dione as white crystals, M.P. 75–6° after recrystallization from ether.

It is to be understood that the foregoing detailed description is given merely by way of illustration and that many variations may be made therein without departing from the spirit of our invention.

Having described our invention, what we desire to secure by Letters Patent is:

1. A compound of the formula:

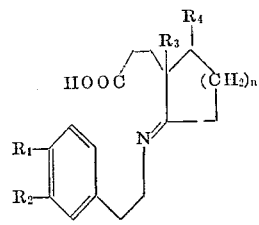

wherein $R_1$ and $R_2$ are each a member selected from the group consisting of hydrogen and lower alkoxy, $R_3$ is a member selected from the group consisting of hydrogen and lower alkyl, $R_4$ is a member selected from the group consisting of hydrogen, hydroxy and keto and $n$ is is one.

References Cited

UNITED STATES PATENTS 3,320,260   5/1967   Brown et al. _____ 260—518

JAMES A. PATTEN, *Primary Examiner.*

A. THAXTON, *Assistant Examiner.*

U.S.Cl. X.R.

260—519, 289, 294.7